UNITED STATES PATENT OFFICE.

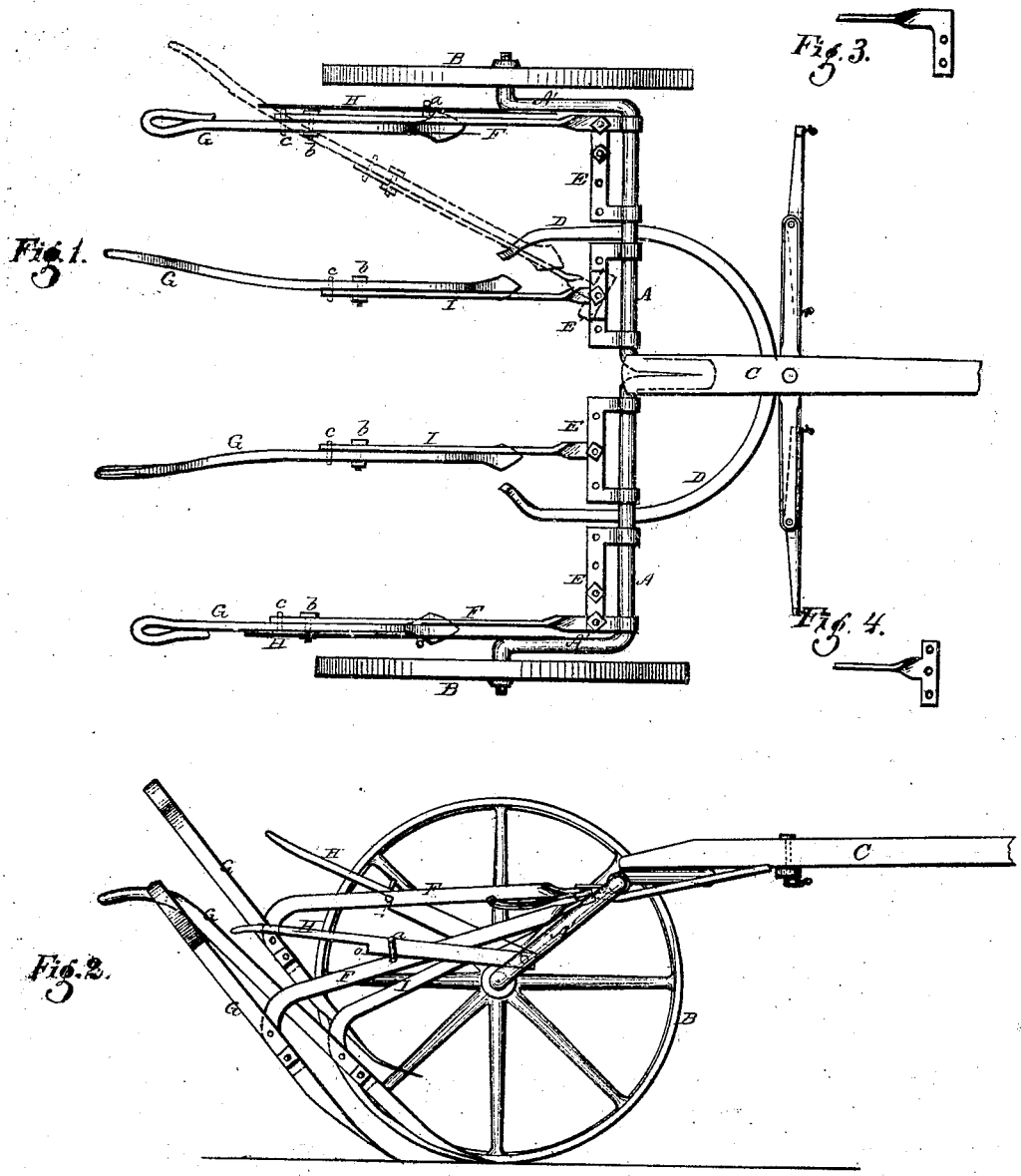

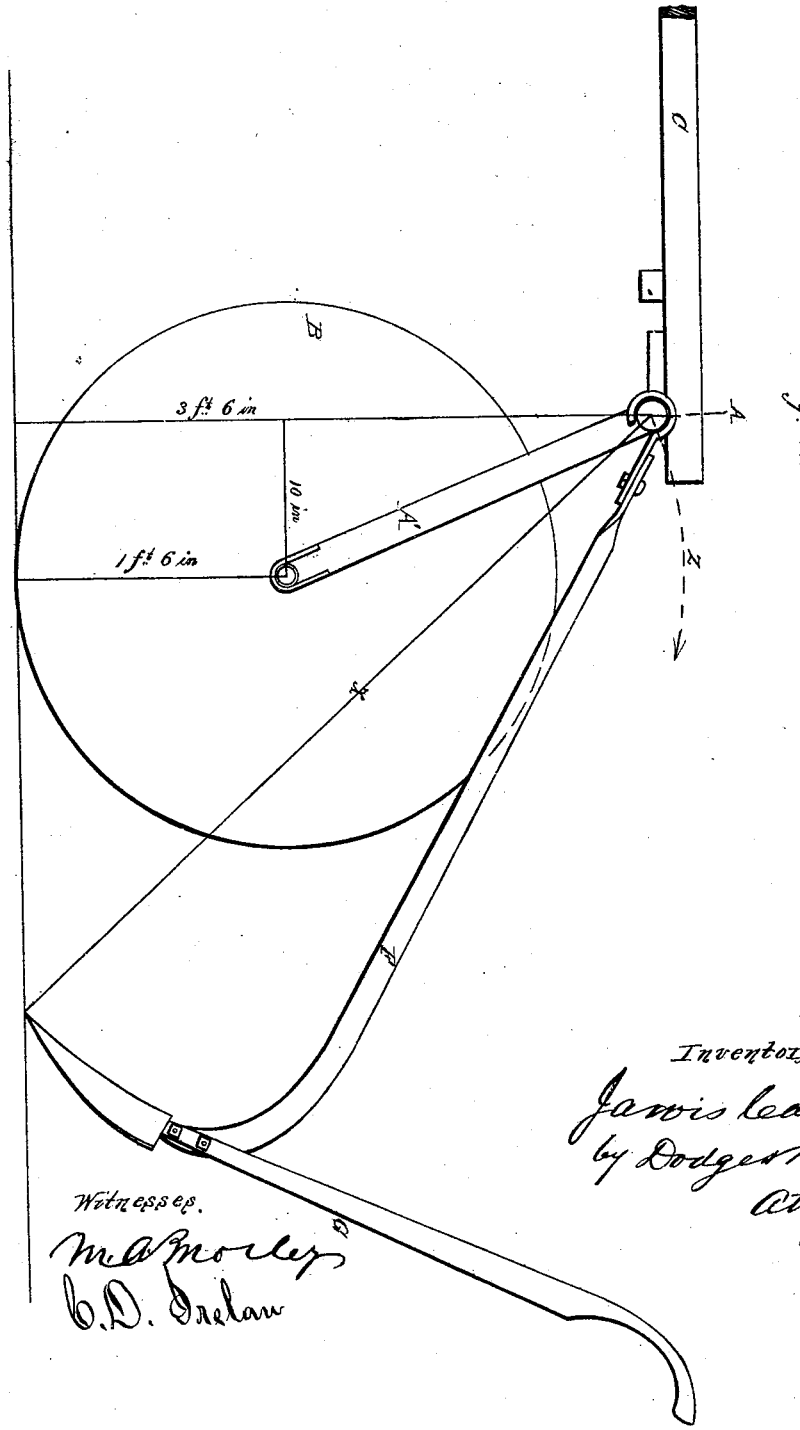

JARVIS CASE, OF LAFAYETTE, INDIANA.

IMPROVEMENT IN CULTIVATORS.

Specification forming part of Letters Patent No. 111,132, dated January 31, 1871.

*To all whom it may concern:*

Be it known that I, JARVIS CASE, of Lafayette, in the county of Tippecanoe and State of Indiana, have invented certain Improvements in Cultivators, of which the following is a specification, reference being had to the accompanying drawings.

My invention relates to that class of cultivators known as "walking-cultivators;" and the invention consists in a peculiar manner of arranging the axle in relation to the beams and shares, whereby the weight or pressure of the tongue upon the necks of the team is lessened; and in the manner of hinging and supporting the beams, all as hereinafter more fully explained.

Figure 1 is a top plan view, and Fig. 2 is a side elevation, of the implement complete. Figs. 3 and 4 are portions shown more in detail.

In constructing my improved cultivator I make an axle of iron, having its body A of a length corresponding to the width of the cultivator, and with arms A'. bent at a right angle to the body, these arms being provided at their lower ends with journals for the wheels B, these journals of course projecting laterally in line with the body A of the axle, as represented in the drawings. The axle thus made is secured rigidly to the tongue in such a position that its arms A' shall be inclined a little forward from the vertical plane, as represented in Fig. 5, in which are indicated the proportions and relative positions of the tongue, axle, arms, wheels, beams, and shovels of the cultivator as I make it for use. By examining this figure it will be seen that the beams F, which are hinged to the body A of the axle, as hereinafter more fully explained, are made of such a length that when properly attached for use in the usual manner their line of draft, which is on the line $x$, extending from the axle to the shovel, will form a greater angle to the vertical plane than that of the arms A', and that consequently when the shovel is inserted in the ground, so as to throw the draft or strain upon it, its tendency will be to pull backward on the body A of the axle and the upper end of the arms A', the tendency being to draw them in the direction indicated by the dotted line $z$; and as the tongue is rigidly attached to the axle A it must move therewith, and thus raise or elevate its front end, thereby relieving the necks of the animals from the downward pressure usual at that point. By this means the downward pressure on the necks of the animals is fully counteracted, as it is obvious that the greater the resistance that the shovels meet with in their passage through the soil the greater will be the tendency to elevate the front end of the tongue. It is obvious that the position of the arms A' may be varied within certain limits without affecting the result to be attained, the only condition being that the arms must not be inclined forward far enough to stand in a plane parallel to the line of draft $x$. They may be vertical, or even inclined backward to a limited extent, without changing the result, except, perhaps, to modify it to some extent; but I prefer the plan shown, as I find in practice that it operates perfectly to accomplish the desired result.

The beams F and I are made of metal, and curved, as represented in Fig. 2, the two outer ones, F, being somewhat longer than the others. To each of these beams I attach a shovel having a handle, G, projecting to the proper height for convenience in holding or guiding, these handles being pivoted to the beams by a bolt, $b$, and locked by a wooden pin, $c$. The beams are secured to the axle by means of metal loops E, which are provided with a series of holes, and which have their ends formed into eyes, clasped around the axles, as shown in Fig. 1. The front ends of the outer beams, F, are bent at a right angle, as represented in Fig. 3, and have two holes, by which they can be bolted rigidly to the loops E, in which case the beams F will have a vertical movement only. By using a single bolt the beams will be left so that they can move laterally and vertically. The object of bending the front end of the beam, as shown, is to afford means for securing it rigidly to the loop E, and at the same time to locate it at the extreme outer edge of the loop. The central beams, I, are secured to similar loops, and their front ends are made with a cross-head of T form, as represented in Fig. 4. These heads are provided with three holes, one being at the center in line with the body of the beam. By inserting a bolt in this hole only, the beam is left free to play laterally on the loop, while it and the loop together play vertically on the axle. By inserting one or more additional bolts the beams I may also be made rigid with the loop, in which case they will be susceptible of a vertical movement only. It is obvious that, if desired, one set of beams may be dispensed with and two shovels only used; also, that, if desired, two shovels may be attached to a single beam, the shovels being arranged at suitable angles laterally, and at proper positions fore and aft.

To support the outer beams, F, when not in use, I provide a bar, H, which has a notch, o, cut in its under side, and which bar I pivot to the arms A' of the axle, as shown in Fig. 2. To the beams F, about midway of their length, on the side adjoining this bar, I secure a pin, a, on which the bar rests loosely, the notch o coming some little distance in rear of the pin when the beam is let down upon the ground. When thus arranged, if the beam be elevated, it will raise the bar H until the pin a arrives at the notch o, when the bar acts as a brace and holds the beam up. The inner beams, I, are supported upon the projecting ends of a curved brace rod or bar, D, which is attached to the under side of the tongue and axle, and thus also serves to brace them firmly, these projecting ends being shown clearly in Fig. 1.

By this method of construction I produce a very simple, cheap, and efficient implement.

Having thus described my invention, what I claim is—

1. A cultivator having the axle A attached rigidly to the tongue, and provided with the arms A', having wheels attached, in combination with the beams hinged to the body A of the axle, and extending backward far enough to cause the line of draft extending from their hinged point to the shovels to fall in rear of the longitudinal plane of the arms A', substantially as and for the purpose set forth.

2. The loops E, hinged or clasped to the axle A, in combination with the beams having the laterally-projecting arm at its front end, whereby the beams can be attached rigidly or loosely to the loops, and still be at liberty to move vertically, substantially as described.

JARVIS CASE.

Witnesses:
LOUIS KIMMEL,
JOHN NULL.